March 17, 1953
W. W. SLOANE
2,631,719
EXTENSIBLE SHAKER CONVEYER
Filed March 31, 1951
3 Sheets-Sheet 1
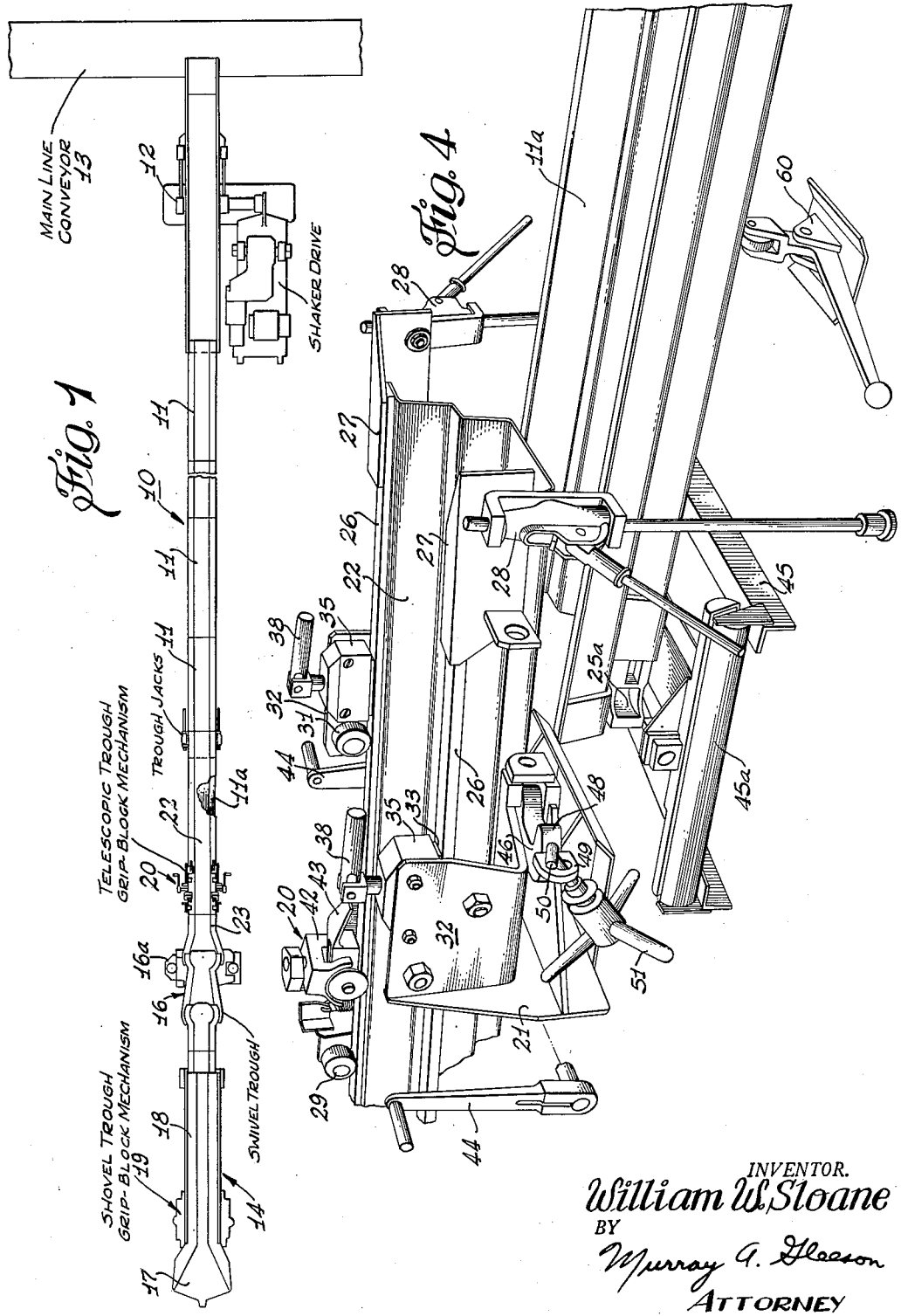
INVENTOR.
William W. Sloane
BY
Murray G. Gleeson
ATTORNEY

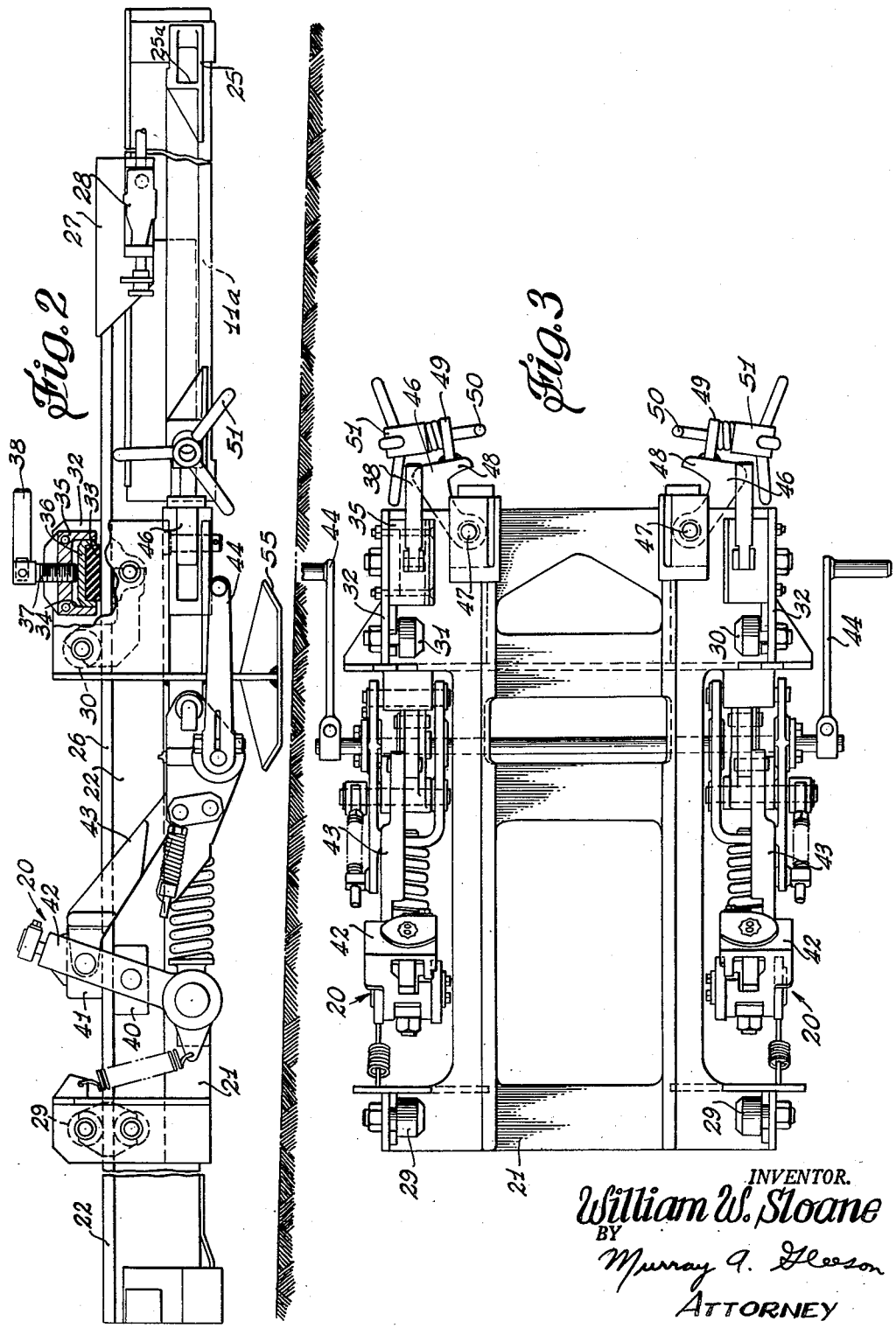

March 17, 1953 W. W. SLOANE 2,631,719
EXTENSIBLE SHAKER CONVEYER
Filed March 31, 1951 3 Sheets-Sheet 3
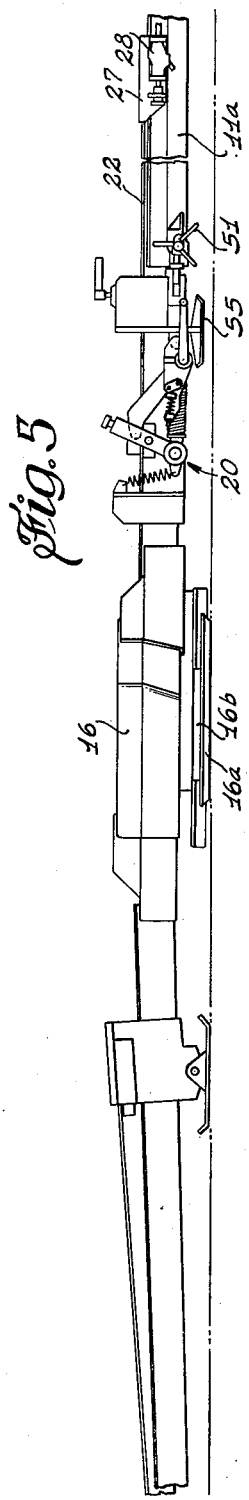
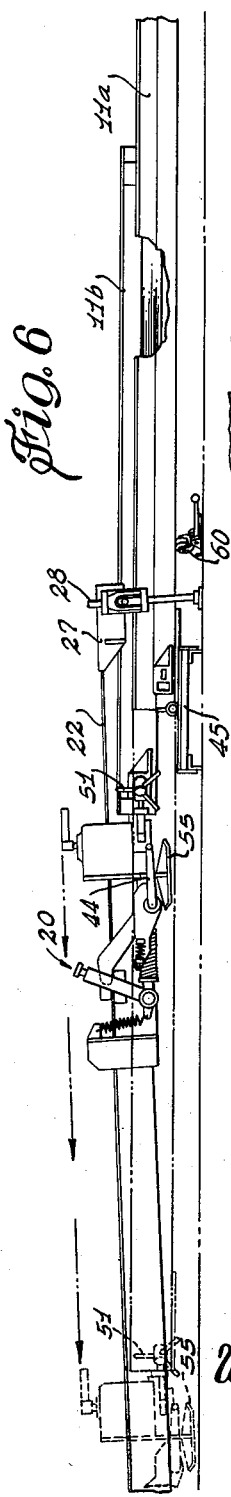
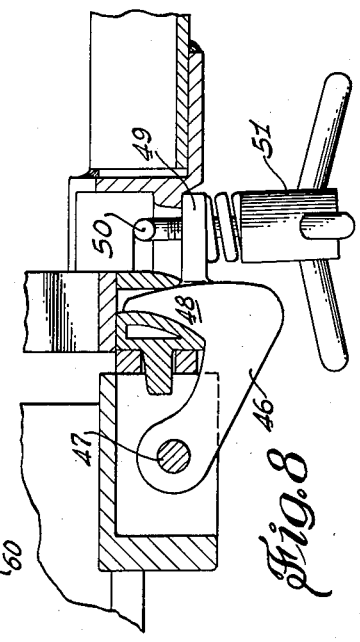
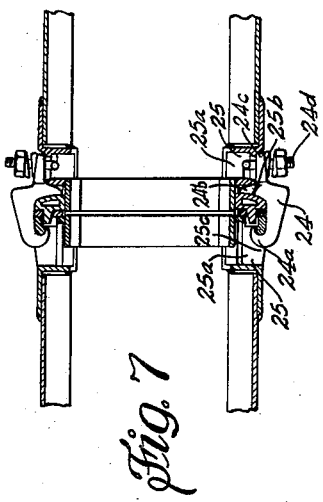
INVENTOR.
William W. Sloane
BY
Murray G. Gleeson
ATTORNEY Patented Mar. 17, 1953

2,631,719

UNITED STATES PATENT OFFICE 2,631,719

EXTENSIBLE SHAKER CONVEYER

William W. Sloane, Chicago, Ill., assignor to Goodman Manufacturing Company, Chicago, Ill., a corporation of Illinois Application March 31, 1951, Serial No. 218,630

6 Claims. (Cl. 198—220)

This invention relates to improvements in shaker conveyors having a trough line made up of detachable trough sections which are insertable in or removable from the trough line. More particularly, the invention relates to shaker conveyors having an extensible feeding device commonly known as a duckbill at its inby end for gathering loose material, which feeding device has a swiveled connection to the trough line so that it can be swung laterally of the various loading angles to the main trough line of the conveyor.

Shaker conveyors of the character above described are usually set up in a mine for conveying loose material from a working face to a loading station at a main entry or passageway. While the working face is being advanced from the loading station, it is necessary to extend the trough line periodically by inserting intermediate detachable trough sections in the main trough line. Such intermediate trough sections are usually about thirteen feet long and are heavy and unwieldy to handle, particularly where the working space is limited as is usually the case in mines.

It has heretofore been common practice to provide an extensible telescopic portion of troughing in the main trough line, including means for clamping the telescoping portions of the trough together, which permits the extension of the forward end including the swivel joint and duckbill relative to the main trough line. As required by advance of the loading operations, such extension of the telescoping trough sections is made in step-by-step increments of a few feet at a time, until the two telescoping portions have reached the limit of extension relative to each other. It is then necessary to disconnect the main line troughing, insert a new, intermediate trough section and restore the telescopic trough sections to telescoped position relative to each other so as to start a new cycle of successive, step-by-step extensions of the forward end of the conveyor, until such time as still another intermediate trough section must be inserted in the trough line.

One of the difficulties of inserting intermediate trough sections as above mentioned is the necessity of moving the heavy forward end of the conveyor toward the working face each time an intermediate trough section is to be inserted in the trough line. One method commonly employed for this purpose is by attaching a cable trained about sheaves anchored adjacent the working face and extended to a power winch or hoist at a convenient point to one side of the conveyor. Much time and labor are required for setting up the anchored sheaves, cable and hoist for this purpose and, in addition, it is always difficult to maintain the disconnected parts of the trough line in proper alignment with each other during advance movement of the front end of the conveyor.

The principal object of the invention is to provide an improved apparatus and method for extending the conveyor trough line when intermediate trough sections are being inserted in the trough line, so as to eliminate much of the manual effort heretofore necessary for this operation.

A further object of the invention is to provide an improved apparatus and method for extending the trough line by utilizing the thrust derived from the shaking motion of the trough line for extending the forward end of the conveyor trough including the swivel joint and duckbill, preparatory to the insertion of an intermediate trough section in the trough line.

A still further object is to provide an improved apparatus and method for maintaining the forward end of the conveyor in proper alignment with the main trough line during the insertion of an intermediate trough section.

Other objects of the invention will appear from time to time as the following description proceeds.

The invention may best be understood by reference to the accompanying drawings, in which:

Figure 1 is a plan view of a shaker conveyor trough line as it might be installed for loading loose material, such as coal, at the working face of the mine for delivery to the main line conveyor in a mine entry;

Figure 2 is a fragmentry side view drawn to a larger scale of the grip block mechanism forming a part of the trough extension apparatus of my invention, with parts thereof broken away to show details of construction, and also with parts of adjacent trough sections broken away;

Figure 3 is a top plan view of the grip block mechanism shown in Figure 2, with the associated trough sections removed therefrom;

Figure 4 is a fragmentary perspective view of the grip block mechanism and associated parts for extending the trough line, and showing two parts of the trough line which had previously been connected in end-to-end relation now shown in temporarily disconnected relation to each other ready for the insertion of a new intermediate trough section in the trough line;

Figure 5 is a side view of a portion of the front end of the conveyor trough line shown in Figure 1, showing the position of the parts after an intermediate trough section is to be inserted in the trough line;

Figure 6 is a side view of a portion of the trough line shown in Figure 5, illustrating a manner in which adjacent trough sections of the main trough line are temporarily disconnected from each other in the manner illustrative in Figure 4, and further showing the manner in which a new intermediate trough section is inserted between the disconnected trough sections;

Figure 7 is an enlarged detailed section showing the fastening means for detachably connecting adjacent trough sections together;

Figure 8 is an enlarged detailed section showing the means for detachably connecting the rear end of the grip block mechanism with the front end of the adjacent trough section.

Referring now to details of the embodiment of my invention shown in the drawings, a typical shaker conveyor installation is shown in Figure 1, wherein a main trough line, indicated at 10, is made of a plurality of conventional trough sections 11, 11 connected in endwise alignment with each other and driven as usual by a shaker drive 12 usually disposed adjacent an unloading station, which herein consists of a main line belt conveyor 13 of conventional construction disposed along a main entry of a mine. The shaker conveyor 10 has a loading head, indicated generally at 14, at the inby end of the trough, said loading head being connected to an articulated joint indicated generally at 16. The articulated joint 16 is provided with the usual anchoring means, herein consisting of a base plate 16a adapted for anchoring to the floor and having suitable guide supporting means thereon, indicated at 16b, permitting reciprocal movement of the articulated joint 16 relative to the anchored base plate 16a during the operation of the conveyor. The anchoring means holds the main portion of the trough line stationary while the loading head 14 and trough section 15 can be swung laterally into various loading angles relative to the main trough line 10.

The loading head 14 consists of a shovel 17 on the forward end of a telescoping trough section 18, which shovel and trough section can be extended or retracted in the usual manner for gathering loose material by manipulating grip blocks of a grip block mechanism, indicated generally at 19, in timed relation with the reciprocating movement of the trough line. The construction and operation of grip block mechanisms of this kind are well known in the art, so further details need not be shown or described herein.

Referring now more particularly to the apparatus and method for extending the length of the main trough section 10 by the insertion of individual trough sections therein, a grip block mechanism, indicated generally at 20, is provided at a suitable point along the main trough line 10 between the swivel joint 16 and the shaker drive 12. In the form shown, said grip block mechanism includes a transversely extending frame 21 mounted on a trough section 22 which is connected in endwise abutting relation to a relatively short length of trough 23 forming the rear part of the swivel joint 16. Any suitable fastening means may be provided for detachably connecting the front end of trough section 22 to the rear end of the trough section 23.

In the form shown herein, the fastening means (Fig. 7) is of the kind disclosed in Patent No. 2,344,300, the main parts of which consist of C-shaped members 24, each having a hooked end 24a at one end and a hooked end 24b at the other end, with a longitudinally extending lug 24c fixed thereon, having a retaining bolt 24d passing therethrough with a T-shaped inner end. These C-shaped members 24 are adapted for detachable fitting engagement in brackets 25, 25 fixed to the ends of adjacent trough sections. Each of these brackets has a relatively large recess 25a open toward the side face thereof, with an arcuately curved cam surface 25b nearest the end of the trough, and also a longitudinally elongated undercut slot 25c shaped adjacent said recess farther away from the trough. When in fastening position, the hooked end 24a is inserted in the longitudinal slot 25c of one bracket. The opposite hooked end 24b is inserted in the recess 25a in the bracket of the adjacent trough. The T-shaped head of the bolt 24d is passed through the longitudinal slot in the second bracket. The bolt is then rotated approximately ninety degrees so that the T-shaped head is retained within said slot, the lug 24c on the bolt being then tightened to secure the fastening member in place. During the tightening of the bolt, the end 24b of the fastening member engages the came surface 25b of the adjacent socket to draw the adjacent brackets together into their final fastened relation.

The trough section 22 is provided with flanges 26 extending along the upper edges thereof, and is generally similar in form and arrangement to the intermediate trough sections 11, 11 of the main trough, excepting that the trough section 22 has no end fastening brackets 24, 24 at its rear end, but has a pair of brackets 27, 27 extending rearwardly beyond the ends of the flanges 26 on which are mounted a pair of auxiliary jacks indicated at 28, as will hereinafter be more fully described.

The grip block mechanism 20, including its frame 21, is slidably supported along the trough section 22 by a plurality of rollers 29, 29 mounted on the front end of the frame 21 and engaging the upper and lower faces of the side flanges 26 at opposite sides of said trough section, and other rollers 30, 31 carried on upstanding standards 32 forming part of the rear end of the frame 21, which rollers also engage the upper and lower faces of the flanges 26.

Means are provided affording frictional adjustment of the frame 21 in any desired position along and relative to the trough section 22. In the form shown herein, two such frictional adjusting means are provided. One consists of a pair of friction blocks 33, 33 vertically movable in recessed channels 34, 34 in brackets 35 connected to the inner faces of the upstanding standards 32 near the rear end of the frame 21. The blocks 33, which may be formed of hard rubber or similar friction material, are mounted in a metallic flanged cover plate 36. The blocks 33 are adapted to be positively forced into frictional engagement with the flanges 26 of the trough section 22 by means of threaded members 37 having hinged handles 38 at their outer ends.

The second frictional adjusting means for frame 21 consists of a conventional yielding grip block mechanism for engaging the trough flanges 26 under limited tension so that the trough may be released from frictional engagement at certain times when endwise thrust on the trough exceeds a predetermined value. This conventional yieldable grip block mechanism includes friction blocks 40, 41 mounted on a tilting carrier 42 above and below each flange 26 at opposite sides of the trough section 22, and operable through a linkage mechanism indicated at 43, by manual control levers 44, for controlling the extension or retraction of a telescoping troughing in the same manner as the grip block mechanism of a conventional duckbill, indicated at 19 in Figure 1. Since such yieldable grip block mechanisms are well known in the art, no further details need be described herein.

The several trough sections 11, 11 of the main trough line are supported in relation to the ground by guide frames 45, 45 of conventional form, resting on the ground at each point of juncture between adjacent trough sections, and having antifriction guideways 45a, 45a on which the trough sections are slidably supported for reciprocating movement in a well-known manner. Details of the guide frames need not be described since their construction and mode of operation are well known in the art.

In the inital assembly of the conveyor, the trough section 22, on which the grip block mechanism 20 is slidably mounted, is connected to the forwardmost trough section 11a indirectly through the frame 21 of the grip block mechanism 20. The fastening means for this purpose consists of C-shaped members 46, 46 which herein are modifications of the C-shaped members 24, 24 previously described in connection with the means for connecting adjacent trough sections together. Instead of having two hooked ends, these C-shaped fasteners 46 are hinged at one end on pivot pins 47, 47 at opposite sides of the frame 21 as shown in Figures 2, 3 and 4. Said fastening members have hooked ends 48, 48, projections 49, 49 and T-shaped bolts 50, 50 corresponding in form and arrangement to the parts 24b, 24c and 24d of the conventional fastening devices previously mentioned. The hinged fasteners 46 have enlarged star-wheel nuts 51, 51 threaded on their outer ends so as to facilitate the tightening of the bolts 50, 50 without the use of a wrench. It will be understood, however, that in all essential respects the fastening members 46, 46 are similar to the conventional C-shaped fastening members 24 excepting that they are employed only on the frame 21 of the grip block mechanism 20 to fasten said frame to the front end of the next adjacent trough section 11a.

The frame 21 also has a depending shoe 55 adapted to provide auxiliary support for the frame 21 in case of excessive sagging of the trough line and to operate as a skid to slide over any objects on the mine floor which might be encountered at that point during the operation of the conveyor.

When the conveyor trough line is assembled for normal operation as shown in Figures 2 and 5, it will be noted that the forwardmost trough section 11a is connected to the frame 21 of the grip block mechanism 20, with the trough section 22 nested telescopically within the front end of said forwardmost trough section 11a. Since the trough section 22 has sliding movement relative to the frame 21 of grip block mechanism 20, as previously described, it will now be understood that the entire front end of the conveyor, including the telescopic trough section 22, the swivel joint 16 and the loading head 14, can be extended or retracted relative to the main trough line 10 when desired.

The use and operation of the apparatus above described is as follows:

The conveyor is initially set up with the several parts connected substantially as shown in Figures 1 and 5, in which it will be noted that the foremost trough section 11a of the main trough line 10 is fastened to the rear end of frame 21 of the grip block mechanism 20 and the grip block mechanism is disposed closely adjacent the front end of the telescoping trough section 22, so that the trough section 22 is in substantially maximum telescoping relation to the trough section 11a in which it is nested. In this position of the parts, the friction pads 33 on frame 21 are firmly locked against the flanges 26 of the telescoping trough section 22 by screwing down the threaded members 37 with handles 38. At this point, it should be explained that this positive locking engagement by means of friction pads 33 between the frame 21 and the telescoping trough 22 is desirable even though the grip blocks 40 and 41 provide a second means of frictional engagement between the frame 21 and said telescoping trough section, because the grip blocks 40, 41 are automatically yieldable under a predetermined load, and it is important to the proper operation of the conveyor as a whole that no slippage occur between the frame 21 and the telescoping trough 22 during the normal shaking operation of the conveyor.

As the loading operation proceeds at the front end of the conveyor, it is desirable from time to time to advance the loading head 14, together with the swivel joint 16, with respect to the main trough line 10. This extension is effected by first releasing the friction blocks 33, 33, and then employing the yieldable grip blocks 40, 41 under control of the manual lever 44 in proper timed relation with the reciprocating motion of the main trough line 10 to move the trough 22 (together with the unjacked swivel joint 16 and loading head 14) forwardly relative to the frame 21. The amount of each such extension usually depends upon the distance which is loaded out by the extensible loading shovel 17 of the loading head 14 during each lateral sweep of said gathering head about its swivel joint across the working face. Assuming that this distance is approximately six to eight feet for each lateral sweep of the shovel, the operator will manipulate the control handle 44 of the grip block mechanism 20 so as to extend the loading head 14 and swivel joint 16 bodily a distance of six to eight feet from its initial position shown in Figures 1 and 5. Thereupon, the friction blocks 33 will again be tightened to lock the frame 21 for reciprocal movement with the trough 22, and normal loading operations are resumed until another advance movement of the loading head is desired.

Assuming that the maximum telescopic extension of the trough 22 with relation to the trough section 11a is approximately 15 feet, it will be understood that the second extension of the loading head 14 will advance the trough 22 substantially to its extreme limit of forward movement relative to the frame 21, so that it is now necessary to insert a new intermediate trough section in advance of the trough section 11a in order to make a subsequent advance of the loading head possible.

The apparatus of my invention is especially designed for the insertion of successive standard trough sections behind the trough section 22 as required from time to time, as follows:

In Figure 2, the parts are shown in position where the frame 21 has substantially reached its forward limit of extension with respect to the trough section 22. With the parts in this position, a jack 60 or similar supporting device is inserted beneath the forward end of the trough section 11a, and the hinged fastening members 46, 46 on the rear end of the frame 21 are disconnected from the trough section 11a by manipulation of the star-wheel nuts 51. The auxiliary jacks 28, 28, pivotally mounted on the outer sides of brackets 27, 27 at the rear end of the telescoping trough section 22, are then brought into use. When not in use, said jacks are swung upwardly into substantially horizontal position along opposite sides of the conveyor as shown in Figure 1. These jacks are now swung into substantially vertical position to engage the ground and are actuated so as to elevate the rear end of the telescoping trough 22 a substantial distance above the trough section 11a, as shown in Figure 4. A ball frame 45 is then placed in supporting position beneath the front end of the trough section 11a and is disposed for connection between the front end of the trough section 11a and a new section 11b (to be described) in the usual manner, as has been described in connection with Fig. 7.

The rear end of the telescoping trough section 22 is elevated by the jacks 28, 28 a sufficient distance to permit the front end of another standard trough section 11b to be inserted with its front end in nested relation within the trough section 11a and slid forwardly therein beneath the telescoping trough section 22, into abutting engagement with the rear end of the frame 21. The fastening devices 46, 46 on the frame 21 are then swung into engagement with the cooperating sockets and slots on the front end of the new trough section 11b, so as to secure said trough to the frame. The friction pads 33 on the frame 21, as well as the yielding friction mechanism controlled by levers 44, are then released so as to permit the frame 21 and the new trough section 11b to be slid forwardly by hand along the telescoping trough section 22 until the rear end of the new trough section 11b passes beyond the front end of trough section 11a. The rear end of the new trough section 11b is then dropped into endwise abutting relation with the front end of the trough section 11a, and the new trough sections 11a and 11b are then fastened together by conventional fastening members 24, 24.

It will now be understood that the jacks 28, 28 can be released and swung upwardly to their normal horizontal position so as to permit the telescoping trough section 22 to assume its normal nested relation within the new trough section 11b. Since the new trough section 11b has been pulled forwardly for substantially the full length of the telescoping trough section 22, the parts are then in the same fully telescoped position shown in Figure 1, excepting that the new trough section 11b now has been inserted in the conveyor in advance of the trough section 11a.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. In an extensible shaker conveyor, a reciprocating trough line including an extensible trough section intermediate the ends of said trough line, means directly connecting one end of said extensible section to the proximate inby end of the trough line, a feeding frame mounted for slidable movement along said extensible trough section, and including yieldable friction feeding means for extending or retracting said extensible trough section in timed relation to the reciprocating motion of said trough line, means for detachably connecting said feeding frame to the proximate outby trough section of said trough line, with said extensible trough section extending in telescopic relation above said proximate outby trough section, and means for elevating said extensible trough section relative to said proximate outby trough section when the feeding frame is disconnected from the latter, to permit the insertion of another trough section in the trough line for connection at its front end to said feeding frame and at its rear end to the front end of said first-named proximate outby trough section.

2. A conveyor structure in accordance with claim 1, wherein the means for elevating the extensible trough section relative to the proximate outby trough section consists of a pair of jacks pivotally mounted at opposite sides of the rear end of said extensible trough section and swingable from an inoperative position along the sides of the trough to a generally vertical position for operative engagement with the ground.

3. A conveyor structure in accordance with claim 1, wherein the feeding frame has antifriction bearing members engaging the extensible trough section to facilitate sliding adjustment along the latter.

4. A conveyor structure in accordance with claim 1, wherein the feeding frame has means for positively locking said frame in various positions of adjustment along the extensible trough section.

5. The method of extending the terminal end of a shaker conveyor trough line including an extensible trough, a feeding frame adjustable along said extensible trough, and a trough section having its front end connected to said feeding frame in telescopic relation below said extensible trough, comprising the steps of: disconnecting the trough section from the feeding frame, separating the feeding frame and extensible trough vertically from the trough section, sliding a new trough section telescopically along the first trough section, connecting the front end of said new trough section to the feeding frame, advancing said feeding frame and new trough section while supported respectively by said telescopic trough section and first trough section, connecting the rear end of said new trough section to the front end of the first trough section, and utilizing the reciprocating motion of the trough line for extending the telescopic trough together with the terminal end of the conveyor.

6. In an extensible shaker conveyor, a reciprocating trough line, a plurality of longitudinally spaced supporting devices therealong affording slidable movement of said trough line relative to the ground, an extensible trough section intermediate the ends of said trough line, means affording direct supporting connection between the inby end of said extensible trough section and the proximate slidably supported end of the trough line, the outby end of said trough section being normally extensible in telescopic relation above the proximate outby section of the trough line, a feeding frame wholly supported for bodily slidable movement along said extensible trough section, said feeding frame including yieldable friction feeding means for extending or retracting said extensible trough section in timed relation to the reciprocating motion of the trough line, means for detachably connecting said feeding frame to the proximate outby trough section of the trough line to permit said extensible trough section and feeding frame to be separable vertically relative to said proximate outby trough section when the feeding frame is disconnected from the latter, whereby another trough section may be inserted in the trough line for connection at its end to said feeding frame and at the other end to the adjacent end of said first-named proximate outby trough section.

WILLIAM W. SLOANE.

REFERENCES CITED

The following references are of record in the file of this patent:

UNITED STATES PATENTS

| Number | Name | Date |
|---|---|---|
| 2,005,567 | Sloane | June 18, 1935 |
| 2,343,144 | Hagenbook | Feb. 29, 1944 |